(12) United States Patent
Bergano et al.

(10) Patent No.: US 6,317,238 B1
(45) Date of Patent: Nov. 13, 2001

(54) CHROMATIC DISPERSION MANAGEMENT FOR OPTICAL WAVELENGTH DIVISION MULTIPLEXED TRANSMISSION SYSTEMS

(75) Inventors: Neal S. Bergano, Lincroft; Xiaobing Ma, Eatontown, both of NJ (US)

(73) Assignee: TyCom (US) Inc., Morristown, NJ (US)

( * ) Notice: Subject to any disclaimer, the term of this patent is extended or adjusted under 35 U.S.C. 154(b) by 0 days.

(21) Appl. No.: 08/883,192

(22) Filed: Jun. 26, 1997

(51) Int. Cl.[7] .................. H04B 10/00; H04B 10/12; H04B 10/16; G02B 6/28
(52) U.S. Cl. ............. 359/161; 359/161; 359/173; 359/179; 385/24; 385/123
(58) Field of Search ................ 359/110, 161, 359/173, 179; 385/28, 123

(56) References Cited

U.S. PATENT DOCUMENTS

| | | | |
|---|---|---|---|
| 5,138,677 | * | 8/1992 | O'Shaughnessy et al. ............ 385/43 |
| 5,559,910 | * | 9/1996 | Taga et al. ............................ 385/24 |
| 5,613,028 | * | 3/1997 | Antos et al. ......................... 385/123 |
| 5,696,614 | * | 12/1997 | Ishikawa et al. .................... 359/124 |
| 5,790,292 | * | 8/1998 | Ostsuka et al. ..................... 359/173 |
| 6,011,638 | * | 1/2000 | Mamyshev et al. ................ 359/179 |

* cited by examiner

Primary Examiner—Jason Chan
Assistant Examiner—M. R. Sedighjan

(57) ABSTRACT

A method and apparatus is provided for dispersion mapping that yields improved transmission performance for optical transmission systems by providing a more optimal balance between the reduction of both accumulated chromatic dispersion and nonlinear mixing. In particular, the chromatic dispersion is arranged on both a short length scale (within one amplification period) and a long length scale so that the average dispersion returns to zero. The dispersion management within one fiber span is arranged so that the magnitude of the dispersion is large in the section of the fiber span in which the optical power is large and is small in the section of the fiber span in which the optical power is small. This arrangement reduces both the amount of nonlinear mixing and the accumulated chromatic dispersion within the given fiber span.

31 Claims, 4 Drawing Sheets

CHROMATIC DISPERSION MANAGEMENT FOR OPTICAL WAVELENGTH DIVISION MULTIPLEXED TRANSMISSION SYSTEMS

FIELD OF THE INVENTION

The invention relates to the optical transmission of information and, more particularly, to a method and apparatus for compensating for chromatic dispersion and nonlinearity that accrue over optical fiber transmission systems.

BACKGROUND OF THE INVENTION

The availability of high performance optical amplifiers such as the Erbium-Doped Fiber-Amplifier (EDFA) has renewed interest in the use of wavelength division multiplexing (WDM) for optical transmission systems. In a WDM transmission system, two or more optical data carrying channels are combined onto a common path for transmission to a remote receiver. Typically, in a long-haul optical fiber system, the set of wavelength channels would be amplified simultaneously in an optical amplifier based repeater. The Erbium-Doped Fiber-Amplifier is particularly useful for this purpose because of its ability to amplify multiple wavelength channels without crosstalk penalty.

Typically, it is advantageous to operate long-haul transmission systems at high data rates per channel. For example, useful data rates include multiples of the Synchronous Digital Hierarchy (SDH) standard, i.e., 2.5 and 10 Gb/s. As the bit rates increase through the gigabit per second range, the optical powers launched into the transmission fiber need to approach 1 mW per channel. As was demonstrated by Bergano et al. (European Conference on Optical Communications, Brussels, Belgium, paper Th.A.3.1, Sep. 1995) the Non-Return-to-Zero (NRZ) transmission format is particularly useful for transmitting large amounts of data over optically amplified fiber paths. However, NRZ channels operating over long distances require sufficient control over the total amount of chromatic dispersion to ensure low dispersion penalties. Accordingly, the preferred transmission medium for such a system is dispersion shifted optical fibers.

Crosstalk, or the mixing of channels through the slight nonlinearity in the transmission fiber, may arise from the combination of long distance, low dispersion and high channel power. The transmission of many WDM channels over transoceanic distances may be limited by nonlinear interactions between channels, which in turn is affected by the amount of dispersion. This subject was reviewed by Forghieri et al. ("Fiber Nonlinearities and their Impact on Transmission Systems," ch. 8, *Optical Fiber Telecommunications*, IIIA, Academic Press, 1997). As discussed in Forghieri et al., this problem may be overcome by a technique known as dispersion mapping, in which the generation of mixing products is reduced by offsetting the zero dispersion wavelength of the transmission fiber from the operating wavelengths of the transmitter. This technique employs a series of amplifier sections having dispersion shifted fiber spans with either positive or negative dispersion. The dispersion accumulates over multiple fiber spans of approximately 500 to 1000 km. The fiber spans of either positive or negative sign are followed by a dispersion-compensating fiber having dispersion of the opposite sign. This subsequent section of fiber is sufficient to reduce the average dispersion (averaged over the total length of the transmission system) substantially to zero. That is, a fiber of high negative (positive) dispersion permits compensation by a length of positive (negative) transmission fiber.

While the previously mentioned technique provides effective dispersion compensation, there is a need to better balance the competing factors of reducing the accumulated chromatic dispersion while also reducing nonlinear mixing.

SUMMARY OF THE INVENTION

In accordance with the present invention, a method and apparatus is provided for dispersion mapping that yields improved transmission performance for optical transmission systems by providing a more optimal balance between the reduction of both accumulated chromatic dispersion and nonlinear mixing. In particular, the chromatic dispersion is arranged on both a short length scale (within one amplification period) and a long length scale so that the average dispersion returns to zero. The dispersion management within one fiber span is arranged so that the magnitude of the dispersion is large in the section of the fiber span in which the optical power is large and is small in the section of the fiber span in which the optical power is small. This arrangement reduces both the amount of nonlinear mixing and the accumulated chromatic dispersion within the given fiber span.

After several sections of the dispersion tapered spans, a section of cable with the opposite sign of chromatic dispersion is used to return the accumulated dispersion back to zero.

In accordance with one embodiment of the invention, a WDM optical communication system is provided that includes a transmitter, a receiver, and an optical fiber transmission path that couples the transmitter to the receiver. The transmission path includes an optical fiber span having at least one optical amplifier therein. A dispersion compensator, which is disposed at an intermediate point along said optical fiber span, has a dispersion value that substantially compensates for dispersion in the optical fiber span at a prescribed wavelength. The optical fiber span has a nonuniform dispersion distribution and/or a nonuniform effective cross-sectional area along its length.

DETAILED DESCRIPTION

Figure 1:
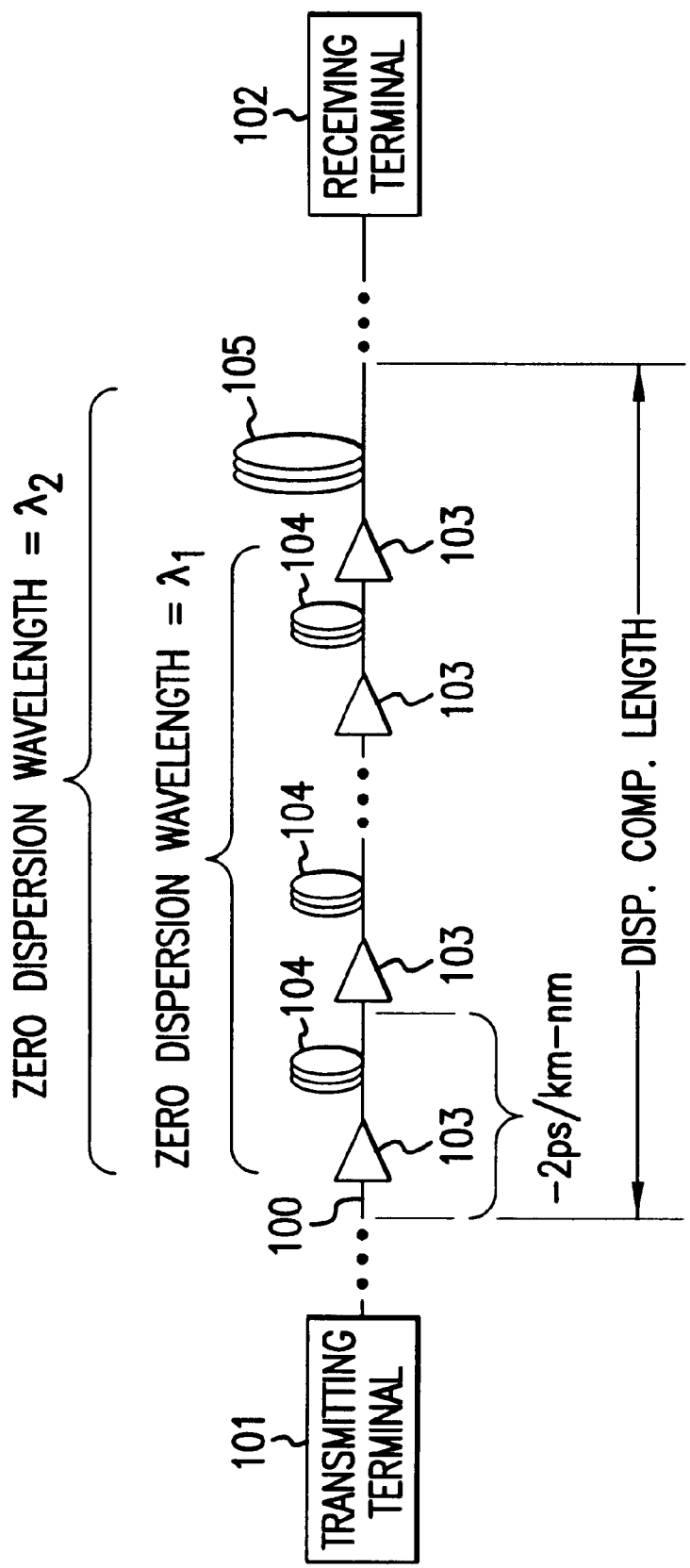
FIG. 1 shows a simplified block diagram of an optical fiber transmission system in accordance with the present invention.

FIG. 1 shows a simplified block diagram of an exemplary optical fiber transmission system in accordance with the present invention. The system includes an optical transmission path 100, a transmitting terminal 101, and a receiving terminal 102. The transmitting terminal 101 provides an optical data signal that is to be transmitted to the remote receiving terminal via the optical fiber transmission path 100. The optical signal presented by the terminal 101 to the transmission path 100 may comprise a plurality of WDM optical carriers each carrying an SDH signal. FIG. 1 shows a single period of the dispersion map consisting of optical amplifiers 103, spans of transmission fiber 104, and dispersion compensator 105. In a typical long-haul system, this series of components constituting the dispersion map period might be repeated a number of times over the length of the system. The optical amplifiers 103 may be EDFAs, for example, which amplify optical signals in the 1550 nm wavelength band. In one embodiment of the invention the transmission fibers 104 may be dispersion-shifted single-mode fibers with an average zero dispersion wavelength higher than the operating wavelengths of the system. For example, the transmission fibers 104 may be similar to those used in Bergano et al. (European Conference on Optical Communications, Brussels, Belgium, paper Th.A.3.1, September 1995), in which the transmission fiber had an average zero dispersion wavelength of 1580 nm and a dispersion slope of about 0.073 ps/km-nm$^2$.

Figure 2:
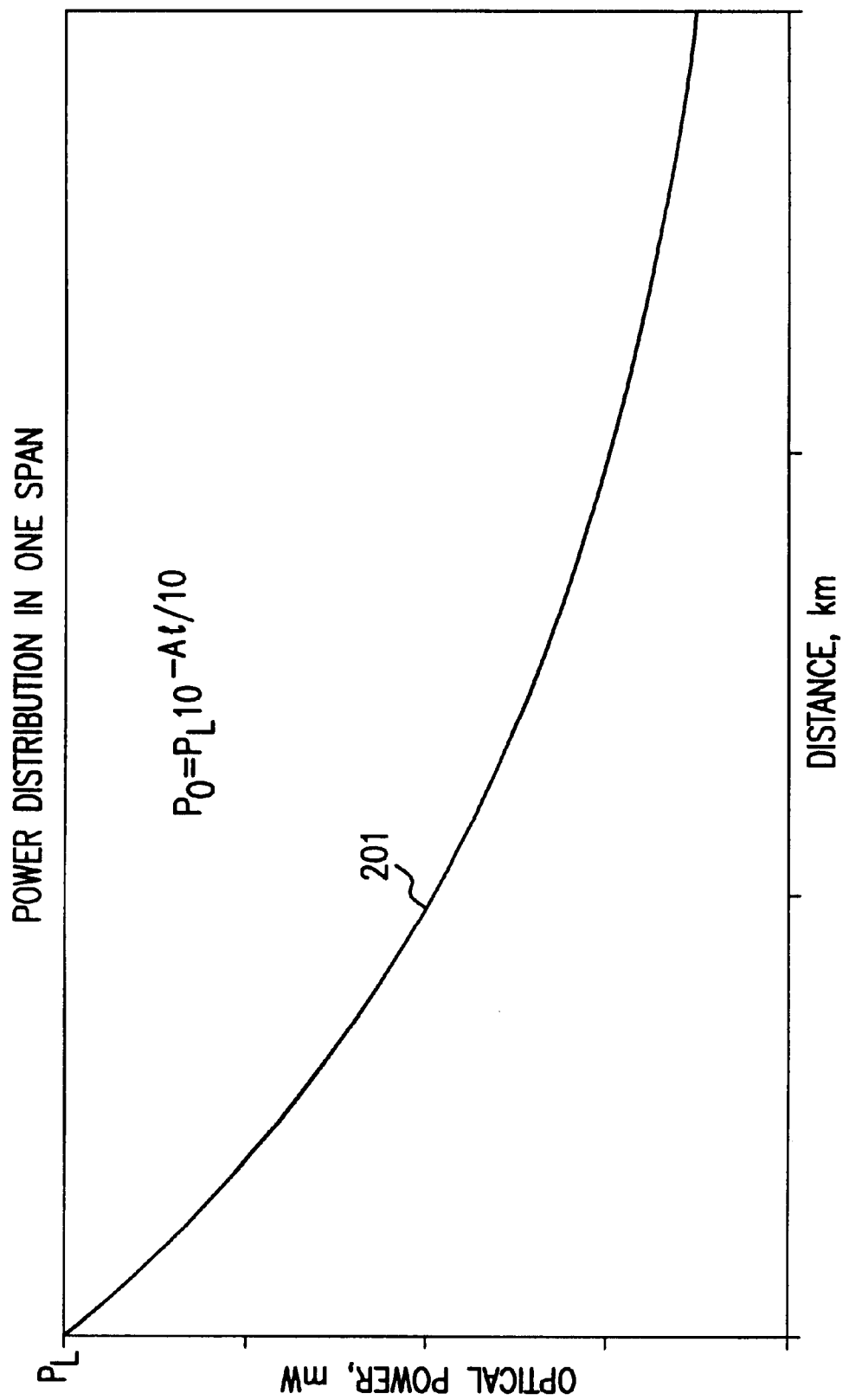
FIG. 2 shows the typical optical power distribution in an optical fiber span.

FIG. 2 shows the optical power distribution 201 within one of the fiber spans 104. As is well know to those skilled in the art, the optical power propagating through an optical fiber decays exponentially. The optical power $P_O$ can be described by the following relationship:

$$P_O = P_L 10^{\frac{-Al}{10}} \quad (1)$$

where $P_L$ is the optical power launched into the fiber, l is the length that the signal has traveled in the fiber, and A is the attenuation in the fiber given in units of dB/unit length.

The present invention takes advantage of the exponentially decaying nature of the power level by distributing the dispersion within a single fiber span 104 in an unequal fashion. Specifically, the dispersion is arranged within a given fiber span so that the dispersion is large in the section of the fiber span supporting a large optical power and is small in the section of the fiber span supporting reduced optical power. That is, the dispersion is greatest near the end of the fiber span into which the power is launched and is smallest near the end of the fiber span from which the power exits. Such an arrangement better optimizes the conflicting dispersion requirements in long-haul transmission systems of small accumulated dispersion for maintaining signal fidelity and large accumulated dispersion for reducing nonlinear mixing.

Figure 3:
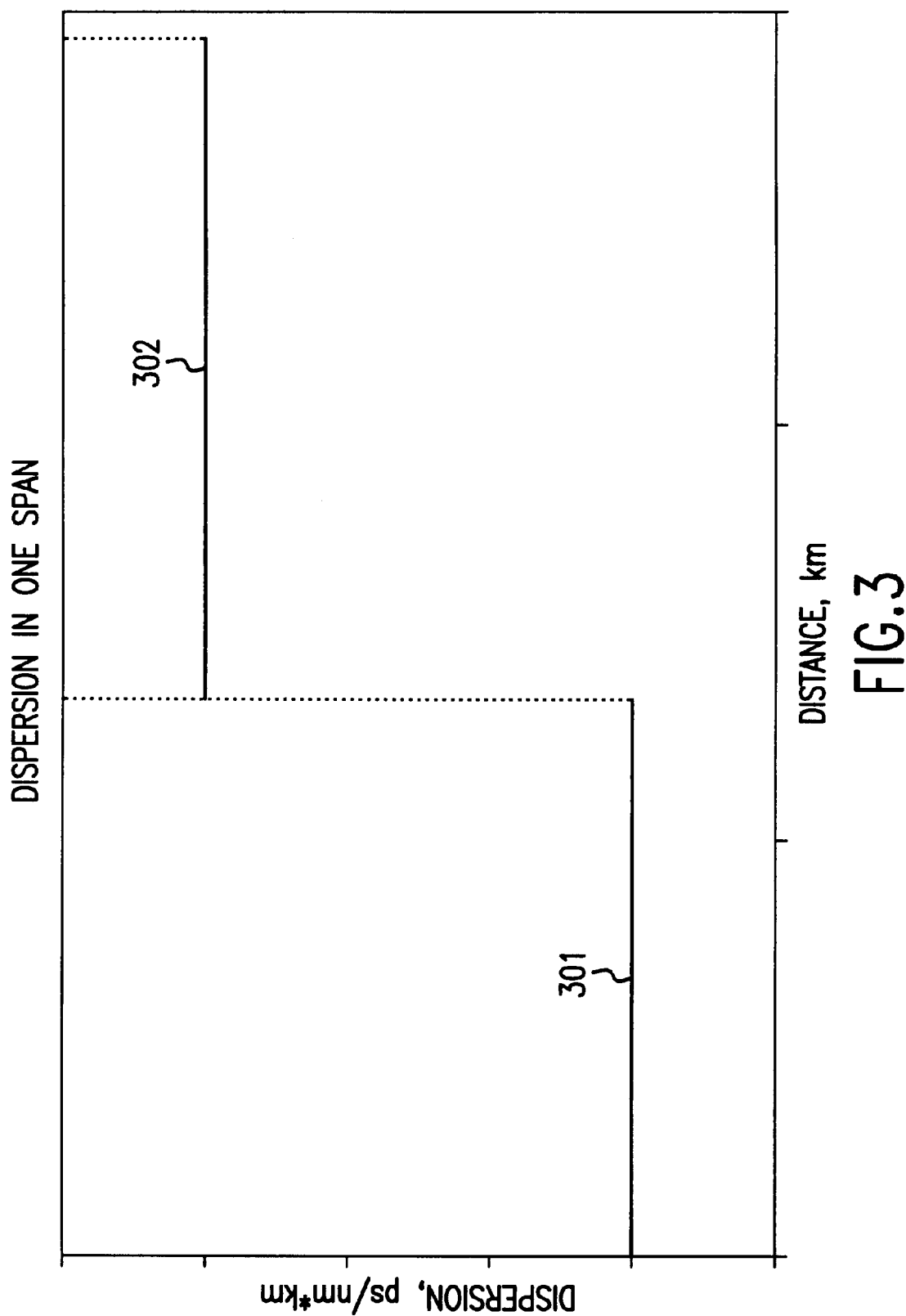
FIG. 3 shows the dispersion distribution along an optical fiber span in accordance with one embodiment of the present invention.

FIG. 3 shows one embodiment of the dispersion distribution in a fiber span in accordance with the present invention. The figure shows the dispersion versus fiber length for a given fiber span, where the origin denotes the end of the fiber into which power is launched. This embodiment of the invention employs a relatively simple bimodal dispersion distribution. That is, in a first portion 301 of the fiber span the absolute value of the dispersion is larger than the dispersion in the second portion 302 of the span. The dispersion within each of the fiber portions 301 and 302 is substantially constant. The following example demonstrates that such a bimodal distribution can significantly reduce the degree of nonlinear mixing within a fiber span. For illustrative purposes only, assume two CW optical carriers are launched into a 45 km span of single-mode dispersion-shifted fiber. Each optical carrier has an average optical power of 1 mW and the fiber has an attenuation of 0.2 dB/km, an effective area of 50 $\mu$m$^2$, a dispersion slope of zero, and a nonlinear index of refraction of 2.4×10$^{-20}$ meters$^2$/Watt (in MKS units). The frequency spacing between the two carriers is 125 GHz, or about 1 nm in wavelength units for a center wavelength of 1555 nm. If the fiber span is first assumed to have a uniform chromatic dispersion of −2 ps/km-nm throughout the 45 km span, the expected amount of optical power in the first side-band generated by the fiber's nonlinear index is 2.1×10$^{-6}$ mW at the fiber output. However, if, in accordance with the present invention, the first 25 km of the fiber span has a dispersion of −3 ps/km-nm while the remaining 20 km of the fiber span has a dispersion of −0.5 ps/km-nm (for an average dispersion of −1.89 ps/km-nm) the resulting power in the first side-band is only 4.5×10$^{-7}$ mW. In other words, the present invention has reduced the power in the side-band by 6.7 dB with a concurrent reduction in the average amount of dispersion.

While FIG. 3 shows a fiber span having a bimodal dispersion distribution, one of ordinary skill in the art will recognize that many other distributions may be employed. For example, the dispersion distribution may instead employ a continuous taper or a series of three or more steps so that a distribution is achieved that approximates a continuous taper as closely as desired.

In accordance with another aspect of the present invention, concomitant with a nonuniform dispersion distribution, the fiber span also may have an effective area that is distributed nonuniformly along the fiber's length. For example, system performance could be improved by providing the first section of the fiber span with a large effective area and a large dispersion, followed by a second section having a smaller effective area and dispersion. This arrangement might be particularly well suited for a WDM application in which a large wavelength space is anticipated. Single-mode fibers having large effective areas are desirable since the optical power propagating in the fiber is distributed over a larger cross sectional area. Thus, the optical power intensity in such a single mode fiber is reduced. A reduced optical intensity advantageously yields less nonlinear impairments in long-haul transmission systems. However, tradeoffs arise when designing a fiber with a larger effective area. The typical tradeoff usually results in a larger dispersion slope characteristic. Unfortunately, a large dispersion slope usually translates into less usable bandwidth in a long-haul WDM transmission system. Thus, for WDM systems, the present invention contemplates the provision of hybrid fiber spans having different effective areas to reduce the average dispersion slope. For example, a 45 km fiber span may comprise a 20 km section of fiber having a 100 $\mu$m$^2$ effective area with an average dispersion of −2 ps/km-nm fiber (over the different WDM channels) and a slope of 0.13 ps/km-nm$^2$, followed by a 25 km section of fiber having an average dispersion of −0.5 ps/km-nm with 55 $\mu$m$^2$ and a dispersion slope of 0.072 ps/km-nm. Alternatively, the fiber span may have cross-sectional area that is tapered along its length.

In accordance with another embodiment of the invention, the fiber span may have a nonuniformly distributed area even in those cases where the dispersion distribution is uniform. Thus, by tapering the cross-sectional area, for example, while the dispersion distribution remains substantially constant, nonlinear effects can be reduced while minimizing the increase in the dispersion slope.

Figure 4:
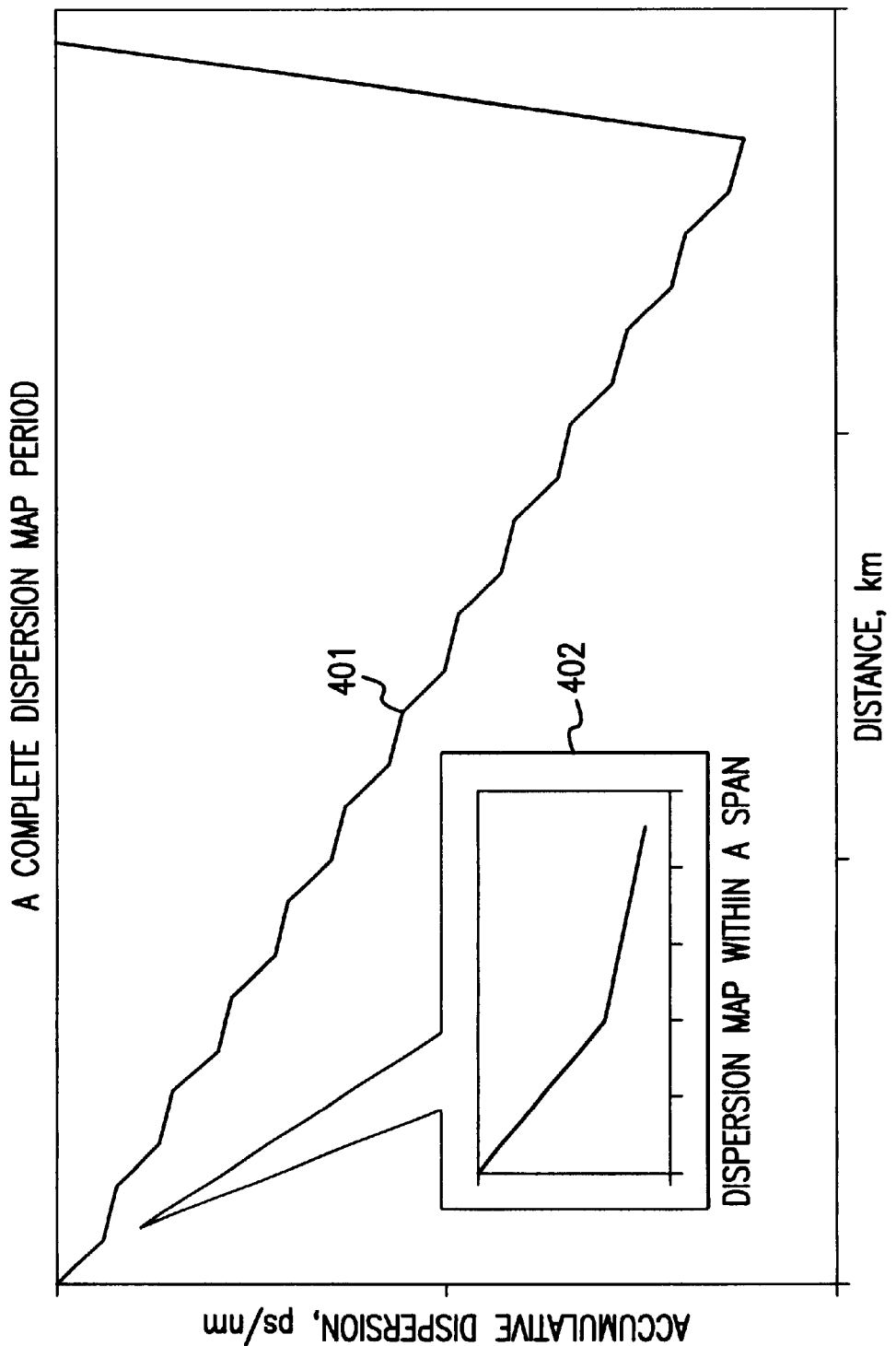
FIG. 4 shows the accumulated dispersion over one period of a dispersion map in accordance with the present invention.

FIG. 4 shows the accumulated dispersion 401 along one dispersion period. The insert 402 to the figure shows the characteristic over a single fiber span 104 (see FIG. 1), and is the integral of the curve shown in FIG. 3. The figure shows the characteristic of the new dispersion map that the dispassion accumulates rapidly in the region of high optical powers, and more slowly in the region of low optical power. As previously mentioned, a complete period of the dispersion map consists of one or more spans of fiber 104 followed by a dispersion equalizing fiber span 105. The dispersion in fiber 105 is designed to bring the accumulated dispersion back to a low value. In practice, the transmission path in a long-haul transmission system would include a series of periods of the dispersion map.

What is claimed is:

1. A WDM optical communication system, comprising:
   a transmitter and a receiver;
   an optical fiber transmission path coupling said transmitter to said receiver, said transmission path including an optical fiber span having at least one optical amplifier therein;
   a dispersion compensator disposed at an intermediate point along said optical fiber span, said dispersion compensator configured to compensate for dispersion in at least said optical fiber span at a prescribed wavelength; and
   wherein said optical fiber span has a first fiber portion defining a first effective area region through which optical energy, at a plurality of wavelengths, effectively propagates and a second fiber portion defining a second effective area region through which optical energy, at said plurality of wavelengths, effectively propagates, said first effective area region having an associated first dispersion characteristic and said second effective area region having an associated second dispersion characteristic, and
   wherein said first and second effective area regions have different dispersion characteristics as to obtain an average dispersion slope for said plurality of wavelengths.

2. The communication system of claim 1, wherein said transmission path includes a plurality of successive optical fiber spans each including at least one optical amplifier and wherein in at least one of said fiber spans, said first and second fiber portions define a tapered effective area region along the respective lengths thereof.

3. The system of claim 2 wherein each of said optical fiber spans has a nonuniform dispersion distribution along its respective length.

4. The system of claim 1, wherein said first effective area region and said second effective area region each have a substantially constant cross sectional area, said first effective area region being substantially greater than said second effective area region, and wherein said first effective area region precedes said second effective area region in said optical fiber span, whereby optical power propagating in the optical fiber span is distributed over a substantially wider area in said first effective area region.

5. The system of claim 3 wherein said nonuniform dispersion distribution decreases in a downstream direction along each of said optical fiber spans.

6. The system of claim 4 wherein said optical fiber span has a bimodal dispersion distribution having a larger value in a first upstream section and a smaller value in a second downstream section.

7. The system of claim 5 wherein each of said optical fiber spans has a bimodal dispersion distribution having a larger value in a first upstream section and a smaller value in a second downstream section.

8. A WDM optical communication system in accordance with claim 1 wherein said average dispersion slope is smaller in magnitude for said plurality of wavelengths than either of the first or second fibers for said plurality of wavelengths.

9. A method of operating a long haul WDM optical communication system having a transmitter, a receiver, and an optical fiber transmission path coupling said transmitter and receiver, said transmission path including an optical fiber span having at least one optical amplifier therein, said method comprising the steps of:

providing, in said optical fiber span, a first fiber portion defining a first effective area region through which optical energy, at a plurality of wavelengths, effectively propagates and a second fiber portion defining a second effective area region through which optical energy, at said plurality of wavelengths, effectively propagates, and wherein said first and second effective area regions have different dispersion characteristics as to obtain an average dispersion slope for said plurality of wavelengths that is less than that which would be obtained in a fiber span comprised of one of the first or second fiber portions, said first and second fiber portions being arranged such that dispersion is greatest near an end of the optical fiber span into which optical signals are launched and smallest near an end of the fiber span from which optical signals exit;

transmitting optical signals on at least some of said plurality of wavelengths through said transmission path; and compensating for dispersion at a prescribed wavelength within said optical fiber span using a dispersion compensator.

10. The method of claim 9 wherein said transmission path includes a plurality of optical amplifiers disposed therealong and wherein said providing step is performed periodically along said fiber span.

11. An apparatus for use in an optical transmission path for exchanging wavelength division multiplexed optical signals between an optical transmitter and an optical receiver;

an optical fiber span having at a first location therealong an effective cross sectional area, through which optical energy at a plurality of wavelengths effectively propagates, that is substantially different than an effective cross sectional area at a second location therealong, whereby optical power of signals propagating in the optical fiber span is distributed over a substantially different area at said first location than at said second location as to obtain an average dispersion slope for said plurality of wavelengths;

an optical amplifier optically coupled to an end of said optical fiber span; and a dispersion compensator disposed along said optical fiber span.

12. The optical fiber span of claim 11, wherein said first location along the optical fiber span is closer than said second location to an end of the optical fiber span onto which optical signals are launched, and wherein the effective cross sectional area at said first location is substantially greater than at said second location, whereby optical power of signals propagating in the fiber is distributed over a substantially larger area at said first location than at said second location.

13. The optical fiber span of claim 12, wherein effective cross sectional area decreases in a taper between said first and second locations along said optical fiber span.

14. A method of operating a long haul WDM optical communication system having a transmitter, a receiver, and an optical fiber transmission path coupling said transmitter and receiver, said method comprising the steps of:

providing in said transmission path,
   an optical fiber span having at a first location thereal-ong an effective cross sectional area, through which optical energy at a plurality of wavelengths effectively propagates, that is substantially different than an effective cross sectional area at a second location therealong, whereby optical power propagating in the optical fiber span is distributed over a substantially different area at said first location than at said second location as to obtain an average dispersion slope for said plurality of wavelengths a dispersion compensator disposed along said transmission path, and an optical amplifier optically coupled to an end of said optical fiber span; and transmitting optical signals on at least some of said plurality of wavelengths through said transmission path.

15. The method of claim 14 wherein said first location alone the optical fiber span is closer than said second location to an end of the optical fiber span onto which optical signals are launched, and wherein the effective cross sectional area at said first location is substantially greater than at said second location, whereby optical power launched into the optical fiber span during said transmitting step is distributed over a substantially larger area at said first location than at said second location.

16. The method of claim 14 wherein said optical fiber span has a bimodal effective cross sectional area distribution having a larger value in a first upstream portion and a smaller value in a second downstream portion.

17. A WDM optical communication system, comprising:

a transmitter and a receiver;

an optical fiber transmission path coupling said transmitter to said receiver, said transmission path including an optical fiber span having at least one optical amplifier therein;

a dispersion compensator disposed at an intermediate point along said optical fiber span, said dispersion compensator having a dispersion value that substantially compensates for dispersion in at least said optical fiber span at a prescribed wavelength; and wherein said optical fiber span has at a first location therealong an effective cross sectional area, through which optical energy at a plurality of wavelengths effectively propagates, that is substantially different than an effective cross sectional area at a second location therealong, whereby optical power propagating in the optical fiber span is distributed over a substantially different area at said first location than at said second location as to obtain an average dispersion slope for said plurality of wavelengths.

18. The system of claim 17, wherein said first location alone the optical fiber span is closer than said second location to an end of the optical fiber span onto which optical signals are launched, and wherein the effective cross sectional area at said first location is substantially greater than at said second location, whereby optical power propagating in the fiber is distributed over a substantially larger area at said first location than at said second location.

19. The system of claim 18, wherein said optical fiber span has a bimodal effective cross-sectional area distribution.

20. The system of claim 18, wherein said optical fiber span has a step-wise effective cross-sectional area distribution.

21. The system of claim 18 wherein said optical fiber span has a nonuniform dispersion distribution along the length thereof.

22. The system of claim 21 wherein said nonuniform dispersion distribution decreases in a downstream direction along said optical fiber span.

23. The system of claim 22 wherein said optical fiber span has a bimodal dispersion distribution having a larger value in a first upstream section and a smaller value in a second downstream section.

24. The system of claim 22 wherein said optical fiber span has a step-wise dispersion distribution comprising at least three steps.

25. The system of claim 18 wherein said transmission path includes a plurality of successive optical fiber spans each including at least one optical amplifier and wherein said dispersion compensator compensates for accumulated dispersion in said plurality of successive optical fiber spans.

26. The system of claim 25 wherein each of said optical fiber spans has a nonuniform dispersion distribution along the length thereof.

27. The system of claim 26 wherein said nonuniform dispersion distribution decreases in a downstream direction along each of said optical fiber spans.

28. The system of claim 27 wherein each of said optical fiber spans has a bimodal dispersion distribution having a larger value in a first upstream section and a smaller value in a second downstream section.

29. The system of claim 17, wherein said transmission path includes a plurality of successive optical fiber spans each including at least one optical amplifier and wherein said dispersion compensator compensates for accumulated dispersion in said plurality of successive optical fiber spans.

30. The system of claim 29, wherein said plurality of successive fiber spans and said dispersion compensator constitute a dispersion map and further comprising a plurality of successive dispersion maps each of which compensate for dispersion accumulating therein.

31. A WDM optical communication system, comprising:

a transmitter and a receiver;

an optical fiber transmission path coupling said transmitter to said receiver, said transmission path including an optical fiber span having at least one optical amplifier therein; and a dispersion compensator disposed along said transmission path, wherein said optical fiber span has at a first location therealong an effective cross sectional area, through which optical energy at a plurality of wavelengths effectively propagates, that is substantially different than an effective cross sectional area at a second location therealong, as to obtain an average dispersion slope for said plurality of wavelengths;

whereby optical power propagating in the optical fiber span is distributed over a substantially different area at said first location than at said second location.

* * * * *